US010412317B2

(12) United States Patent
Ota

(10) Patent No.: US 10,412,317 B2
(45) Date of Patent: Sep. 10, 2019

(54) DISPLAY CONTROL APPARATUS AND DISPLAY CONTROL METHOD

(71) Applicant: CANON KABUSHIKI KAISHA, Tokyo (JP)

(72) Inventor: Tomohiro Ota, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 9 days.

(21) Appl. No.: 15/807,198

(22) Filed: Nov. 8, 2017

(65) Prior Publication Data
US 2018/0139394 A1 May 17, 2018

(30) Foreign Application Priority Data
Nov. 11, 2016 (JP) .................... 2016-220415

(51) Int. Cl.
*H04N 5/262* (2006.01)
*H04N 5/232* (2006.01)
*H04N 5/265* (2006.01)

(52) U.S. Cl.
CPC ....... *H04N 5/2628* (2013.01); *H04N 5/23216* (2013.01); *H04N 5/23293* (2013.01); *H04N 5/232127* (2018.08); *H04N 5/265* (2013.01); *H04N 5/23222* (2013.01)

(58) Field of Classification Search
CPC ........... H04N 5/2628; H04N 5/232127; H04N 5/23216; H04N 5/23293; H04N 5/265; H04N 5/23222
See application file for complete search history.

(56) References Cited

U.S. PATENT DOCUMENTS

2016/0373660 A1* 12/2016 Saito .................... H04N 5/2628

FOREIGN PATENT DOCUMENTS

| JP | 2008-211630 A | 9/2008 |
| JP | 2013-201527 A | 10/2013 |

* cited by examiner

Primary Examiner — Twyler L Haskins
Assistant Examiner — Fayez Bhuiyan
(74) Attorney, Agent, or Firm — Canon U.S.A., Inc. IP Division

(57) ABSTRACT

Control is performed so that when an enlarged display state of a captured image is switched to an entire display state, and in a case where a particular operation is performed in the enlarged display state, a display item regarding focus adjustment is displayed at a position which is determined according to an enlarged area after movement of the enlarged area based on a movement instruction to move the enlarged area given in the enlarged display state, and in a case where the particular operation is not performed in the enlarged display state, the display item regarding focus adjustment is displayed at a position unrelated to the movement of the enlarged area based on the movement instruction.

12 Claims, 6 Drawing Sheets

DISPLAY CONTROL APPARATUS AND DISPLAY CONTROL METHOD

BACKGROUND OF THE INVENTION

Field of the Invention

One disclosed aspect of the embodiments relates to a display control apparatus having the function of displaying an image obtained by an image capture unit in an enlarged manner.

Description of the Related Art

Conventionally, an imaging apparatus having an autofocus (AF) function often displays a focusing area to be subjected to AF control as a rectangle on an image (displays an AF frame). Further, an imaging apparatus having the function of displaying an area regarding a focusing area in an enlarged manner to allow the user to check the degree of focus of the focusing area is known. Japanese Patent Application Laid-Open No. 2013-201527 discusses the following technique. After the display of an AF frame is moved, and if enlarged display is performed, an area having its center at the AF frame is displayed in an enlarged manner. If an enlargement position moves, a focusing area is not changed. After the enlarged display ends, the AF frame is displayed at the previous position. Further, Japanese Patent Application Laid-Open No. 2008-211630 discusses the following technique. After enlarged display is performed, and if an enlargement position is moved, a focusing area is moved according to the movement of the enlargement position. It is, however, not possible to uniformly determine which position is desirable for a focusing area. For example, after a focusing area is enlarged in the state where the focusing area is adjusted to a main object, and if another object is temporarily checked by moving an enlarged area, it is desirable that the focusing area should remain on the previous main object also after the enlargement is ended. If, on the other hand, an object moving during enlargement is tracked in an enlarged area, it is desirable that a focusing area should move after the enlargement is ended.

SUMMARY OF THE INVENTION

After an image is enlarged, and an enlarged area is changed, an image indicating an appropriate focus adjustment position according to the situation is displayed.

According to an aspect of the embodiments, a display control apparatus includes a reception unit, a switching unit, and a display control unit. The reception unit is configured to, in an enlarged display state where a partial enlarged area in a captured image is displayed on a display unit, receive a movement instruction to perform a movement of the enlarged area as a display target of the display unit. The switching unit is configured to switch the enlarged display state to an entire display state where an entirety of the captured image is displayed. The display control unit is configured to perform control so that when the enlarged display state is switched to the entire display state, and in a case where a particular operation is performed in the enlarged display state, a display item regarding focus adjustment is displayed at a position which is determined according to the enlarged area after the movement of the enlarged area, and in a case where the particular operation is not performed in the enlarged display state, the display item regarding focus adjustment is displayed at a position unrelated to the movement of the enlarged area.

Further features of the disclosure will become apparent from the following description of exemplary embodiments with reference to the attached drawings.

DESCRIPTION OF THE EMBODIMENTS

An exemplary embodiment of the disclosure will be described in detail below with reference to the accompanying drawings.

It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment.

Figure 1:
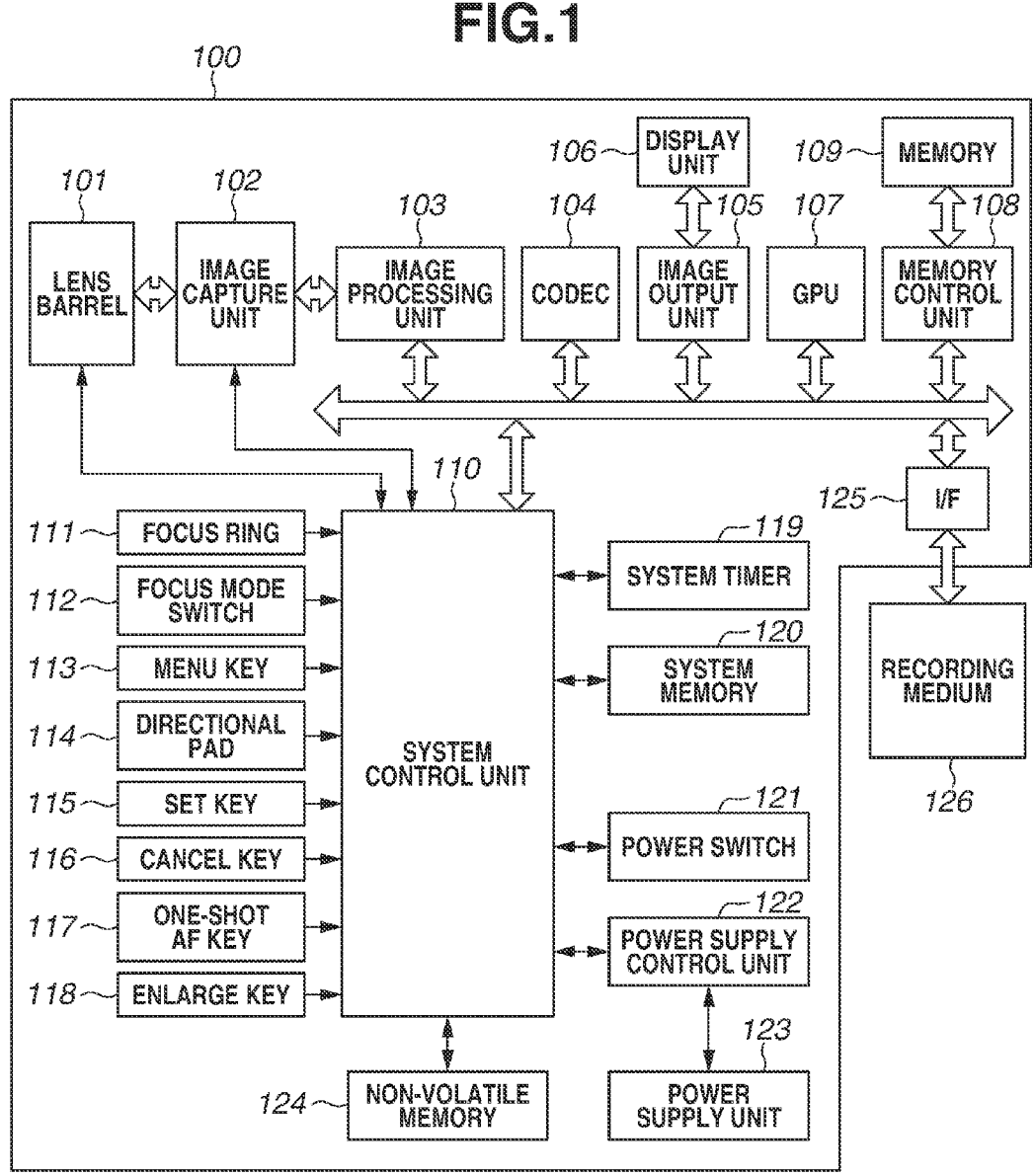
FIG. 1 is a block diagram illustrating a configuration of a digital video camera.

FIG. 1 is a block diagram illustrating the configuration of a digital video camera according to a first exemplary embodiment. The digital video camera is an example of a display control apparatus. The digital video camera includes a housing 100, which contains many of the components of the digital video camera. A lens barrel 101 includes imaging lenses such as a focus lens and an image stabilization lens, and a diaphragm. Further, in many cases, the lens barrel 101 is configured in an integrated manner with a focus ring 111. The lens barrel 101 may be integrated with the housing 100, or may be separable from the housing 100. An image capture unit 102 includes an image sensor for converting an optical image into an electric signal, and an analog-to-digital (A/D) converter for converting an analog signal into a digital signal.

An image processing unit 103 performs a predetermined resizing process, a trimming process, a color conversion process, and a distortion correction process on data from the image capture unit 102 or data from a memory control unit 108 to generate a video random-access memory (VRAM) in a memory 109 via the memory control unit 108. Further, the image processing unit 103 performs a predetermined calculation process using captured image data. Based on the calculation result obtained by the image processing unit 103, a system control unit 110 performs exposure control, distance measurement control, and image stabilization control. The predetermined calculation process also includes the function of detecting an object, such as a face. Consequently, an autofocus (AF) process, an automatic exposure (AE) process, and an image stabilization process are performed. The image processing unit 103 further performs a predetermined calculation process using captured image data and performs an automatic white balance (AWB) process based on the obtained calculation result. Further, the image processing unit 103 inputs a VRAM obtained by a codec 104 decoding encoded image data and performs a resizing process and a color conversion process on the VRAM to generate a new VRAM.

The codec 104 encodes a VRAM generated by the image processing unit 103, using a moving image compression method such as Moving Picture Experts Group (MPEG) 2 or H.264, or decodes encoded image data from the memory control unit 108 and transfers the image data as a VRAM to the memory control unit 108. An image output unit 105 reads via the memory control unit 108 a plurality of VRAMs stored in the memory 109 and superimposes the plurality of VRAMs on each other to obtain an image signal. The image output unit 105 can also cut out and enlarge only a partial area in a VRAM to obtain an image signal. Further, the image output unit 105 can also apply a peaking process for adjusting the sharpness of an image represented by an input VRAM, or enhancing the edge of the image and output the image.

A display unit 106 displays an image signal output from the image output unit 105. The display unit 106 includes a small-sized display device, such as a liquid crystal panel or an organic electroluminescent (EL) panel. The display unit 106 may be a display unit integrated with the digital video camera, or may be an external device used while connected to the digital video camera.

A graphics processing unit (GPU) 107 renders a character string and an icon representing the state and the setting of the digital video camera, and various frames and markers in a VRAM on the memory 109. The GPU 107 reads the characters and the icon stored in a non-volatile memory 124 and renders the characters and the icon in the VRAM. Further, the GPU 107 also has a mixer function for trimming a VRAM, combining a plurality of VRAMs, or resizing a VRAM to a VRAM having different resolution. The mixer also includes the function of converting the color space of a rendered VRAM into a color space required by the image output unit 105.

The memory control unit 108 has the function of mediating a request to access from each block to the memory 109. The memory 109 stores a VRAM to be handled by each of the image processing unit 103, the codec 104, the image output unit 105, and the GPU 107. Further, the memory 109 also functions to temporarily store encoded image data output from the codec 104 or encoded image data read from a recording medium 126. The memory 109 has sufficient recording capacity to store a moving image and a sound of a predetermined length of time.

The system control unit 110 controls the entirety of the digital video camera. The system control unit 110 reads a program recorded in the non-volatile memory 124 and executes the program, to control the components. Thus, the system control unit 110 achieves operations in the present exemplary embodiment. The system control unit 110 may include a plurality of CPU cores. In this case, the plurality of CPU cores can process a task described in the program in a shared manner. The system control unit 110 may also execute instructions from volatile memory such as the system memory 120 to perform operations described in the following.

The focus ring 111 is an operation unit for driving the focus lens included in the lens barrel 101 and giving a focusing instruction. There are a case where the focus ring 111 is directly connected to the focus lens by a mechanical structure, and a case where the focus ring 111 is electrically linked to the focus lens via the system control unit 110. In either case, the system control unit 110 can detect that the focus ring 111 is operated.

A focus mode switch 112 is used to give an instruction to switch a focus mode to AF or manual focus (MF). When the focus mode is AF, the system control unit 110 automatically drives the focus ring 111 on the basis of a focus evaluation value and object detection information obtained from the image processing unit 103, even if the focus ring 111 is not operated. When the focus mode is MF, the focus ring 111 is driven only when the focus ring 111 is operated or a one-shot AF key 117 is pressed.

A menu key 113 is used to give an instruction to open or close a menu screen on the display unit 106. It is possible to change the settings of the components of the digital video camera by performing an operation while the menu screen is displayed. For example, it is possible to set the focus driving speed when AF is performed, or select whether to enable or disable an object detection function. A directional pad 114 is used in various uses. For example, the directional pad 114 is used to give an instruction to move a cursor displayed on the menu screen. A set key 115 is used in various uses. For example, the set key 115 is used to give an instruction to finalize a setting item or a setting value selected using the cursor on the menu screen. A cancel key 116 is used in various uses. For example, the cancel key 116 is used to give an instruction to return from a state in the middle of setting to the last state on the menu screen, or close the menu screen.

The one-shot AF key 117 is used as follows. Even if the focus mode is MF, but while the one-shot AF key 117 is pressed, the system control unit 110 controls the components similarly to when the focus mode is AF. An enlarge key 118 is used as follows. If the enlarge key 118 is pressed, the system control unit 110 instructs the image output unit 105 to perform enlarged display, and a part of an image displayed on the display unit 106 is displayed in an enlarged manner. An image is displayed in an enlarged manner when focusing is performed using the focus ring 111 (MF is performed), or when the user wishes to check the result of focusing performed using the one-shot AF key 117 (after AF is performed). Consequently, it is possible to visually check the state of the focus more accurately. A system timer 119 is a time measurement unit for measuring the time used for various types of control and the time of a built-in clock.

As a system memory 120, a random-access memory (RAM) is used. A constant and a variable for the operation of the system control unit 110 and a program or instructions read from the non-volatile memory 124 are loaded into the system memory 120. Further, the system control unit 110 controls the memory 109, the GPU 107, and the image output unit 105 to also perform display control. The system memory 120 and the memory 109 may be the same memory. In this case, since the memory control unit 108 mediates access to this memory, a small-capacity memory accessible at high speed may be separately and directly connected to the system control unit 110.

A power switch 121 issues to the system control unit 110 a request to turn on or turn off the entirety of the digital video camera. A power supply control unit 122 includes a battery detection circuit, a direct-current-to-direct-current (DC/DC) converter, and a switch circuit for switching blocks to which to apply a current. The power supply control unit 122 detects the presence or absence of attachment of a battery, the type of a battery, and the remaining life of a battery. Further, the power supply control unit 122 controls the DC/DC converter based on these detection results and an instruction from the system control unit 110 and supplies a required voltage to the components including the recording medium 126 for a required period. A power supply unit 123 includes a primary battery, such as an alkaline battery or a lithium battery, a secondary battery, such as a nickel-cadmium (NiCd) battery, a nickel-metal hydrate (NiMH) battery, or a lithium-ion (Li) battery, or an alternating current (AC) adapter.

The non-volatile memory 124 is an electrically erasable and recordable memory. As the non-volatile memory 124, for example, an Electrically Erasable Programmable Read-Only Memory (EEPROM) is used. The non-volatile memory 124 records a constant for the operation of the system control unit 110 and a program. The "program" refers to a program for executing various flow charts described below in the present exemplary embodiment. The functions and the processing of the digital video camera described below are achieved by the system control unit 110 reading a program stored in the non-volatile memory 124 and executing the program.

An interface (I/F) 125 is an I/F with the recording medium 126 such as a memory card or a hard disk. The recording medium 126 records, via the I/F 125, encoded image data stored in the memory 109, or reads encoded image data and accompanying data recorded in the recording medium 126 itself and transfers the encoded image data and the accompanying data to the memory 109 via the I/F 125. The recording medium 126 may be a memory card, a hard disk drive, or a disc to be attached to the digital video camera, or may be a flash memory or a hard disk drive built into the digital video camera.

Figure 2A:
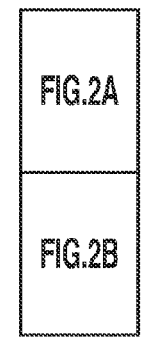
FIG. 2 is a diagram including the flowcharts of FIGS. 2A and 2B and illustrating a display control process.
Figure 2A:
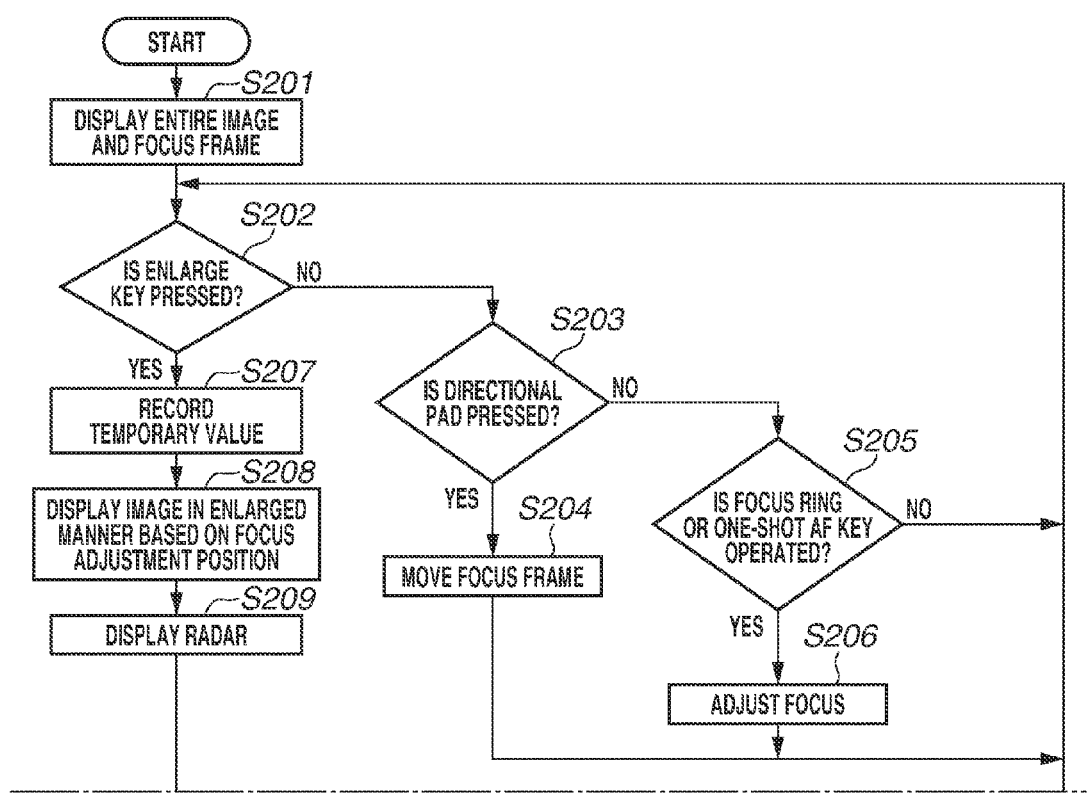
Figure 2B:
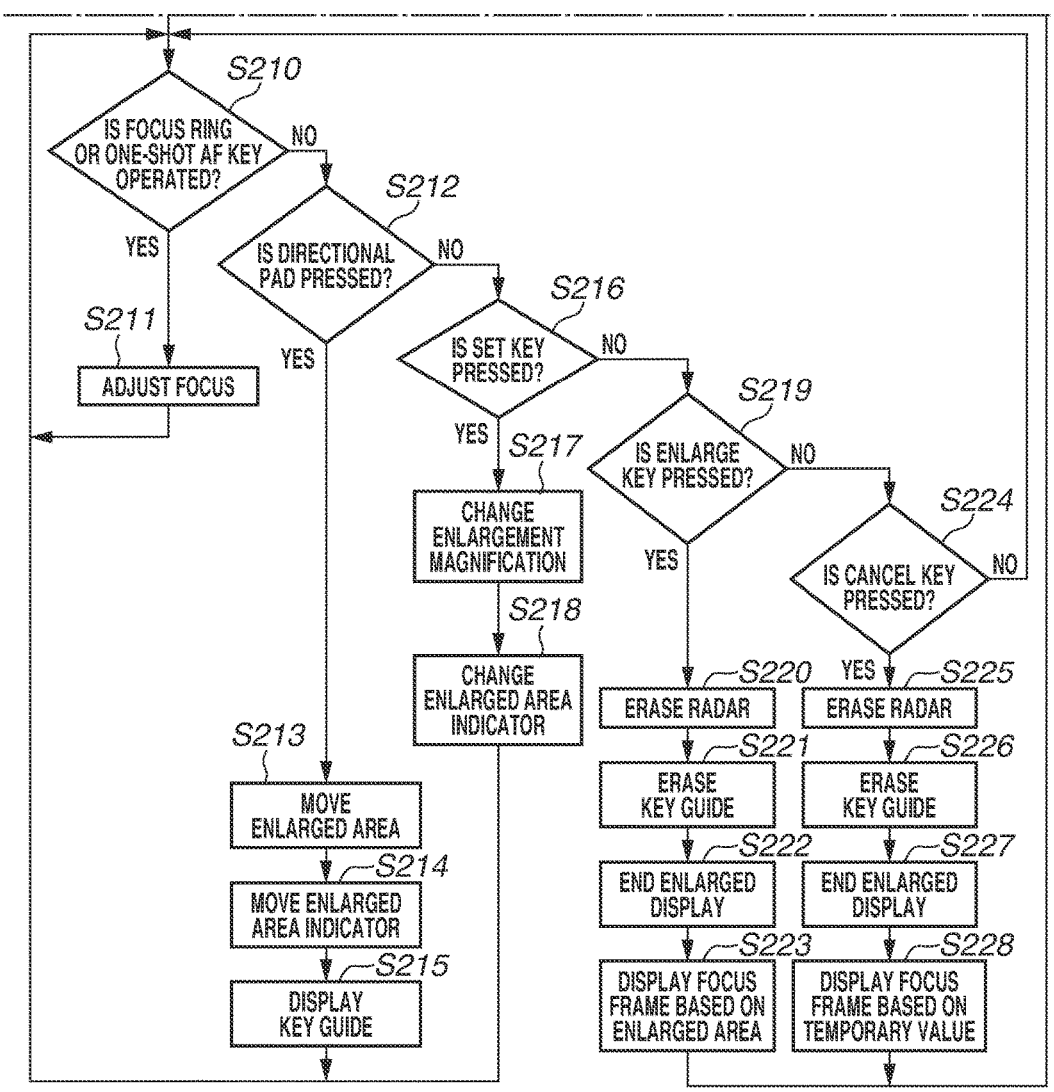

FIG. 2 is a flowchart illustrating a display control process performed by the digital video camera. The operation of this flowchart is achieved by the system control unit 110 controlling the components of the digital video camera on the basis of a program stored in the non-volatile memory 124. This flowchart is executed in the state where the focus mode switch 112 is set to MF. Further, FIGS. 3A to 3D are diagrams illustrating examples of the display of the display unit 106 in the process of the operation illustrated in the flowchart in FIG. 2.

In step S201, the system control unit 110 performs control so that an image captured by the image capture unit 102 is displayed. The system control unit 110 further performs control so that a focus frame indicating a focus adjustment position set for the image is displayed on the image on the display unit 106. The image is an example of a captured image. Further, to distinguish the image from an image of a partial area to be displayed in an enlarged manner, the entirety of the image as a display target in step S201 is referred to as an "entire image". Further, the focus adjustment position set for the image is referred to as a "set position". The set position is used as an initial value in processing regarding the focus, such as an initial value of the focus adjustment position in an image capture control process. The set position is used as, for example, a focus adjustment position where AF is performed, or the position where the amount of defocus is acquired.

Figure 3A:
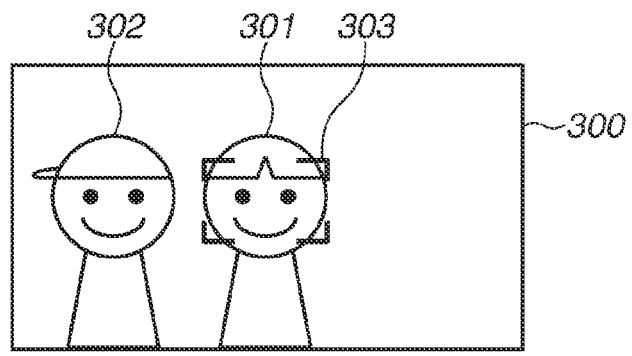
FIGS. 3A to 3D are diagrams illustrating examples of display of a display unit.

FIG. 3A is a diagram illustrating an example of the display of the display unit 106 in step S201. On the display unit 106, an entire image 300, which includes objects 301 and 302, is displayed. Further, a rectangular focus frame 303 is displayed in a superimposed manner on the entire image 300. In this case, the focus frame 303 is an example of a display item indicating a focus adjustment position regarding focus adjustment. For the entire image 300, a position on the object 301 is set as the set position of the focus adjustment position, and the focus frame 303 is displayed at this position. The focus adjustment position is basically an AF position. If an instruction to perform AF is given, AF is performed at this position. Depending on the configuration of the image sensor included in the image capture unit 102, the focus frame 303 may further indicate an indicator indicating the difference in distance between the position of the object 301 and an in-focus position that overlap each other (a focus guide indicating the degree of focus based on the amount of defocus). In this case, by both visually checking the image and checking the difference in distance indicated by the indicator, a user can check the result of focusing performed by operating the focus ring 111.

Next, in step S202, the system control unit 110 determines whether the enlarge key 118 is pressed. If it is determined that the enlarge key 118 is pressed (YES in step S202), the processing proceeds to step S207. If it is determined that the enlarge key 118 is not pressed (NO in step S202), the processing proceeds to step S203. In step S203, the system control unit 110 determines whether any of the directions on the directional pad 114 is pressed. If any of the directions is pressed (YES in step S203), the processing proceeds to step S204. If the directional pad 114 is not pressed (NO in step S203), the processing proceeds to step S205. In step S204, the system control unit 110 moves the focus adjustment position in the direction pressed on the directional pad 114 and moves the focus frame 303 to indicate the moved focus adjustment position. Information indicating the focus adjustment position is held in the system memory 120 and updated according to the movement of the focus frame 303. In the present exemplary embodiment, the focus adjustment position is the coordinate values of a single point, and the focus frame indicates a rectangular area having its center at the focus adjustment position. Alternatively, as another example, the focus adjustment position may be a value indicating a rectangular area as in the focus frame, or may be an identifier indicating any one of a plurality of focus adjustment position candidates.

In step S205, the system control unit 110 determines whether the focus ring 111 or the one-shot AF key 117 is operated. If it is determined that the focus ring 111 or the one-shot AF key 117 is operated (YES in step S205), the processing proceeds to step S206. If it is determined that neither the focus ring 111 nor the one-shot AF key 117 is operated (NO in step S205), the processing proceeds to step S202.

In step S206, the system control unit 110 drives the focus lens in the lens barrel 101 to adjust the focus. For example, if the focus ring 111 rotates in step S205, the system control unit 110 adjusts the focus according to the rotational angle of the focus ring 111 (an MF operation). Further, if the one-shot AF key 117 is pressed in step S205, the system control unit 110 makes an automatic adjustment (AF) so that the object 301 at the focus adjustment position on which the focus frame 303 is displayed in a superimposed manner is in focus. After the process of step S206, the processing proceeds to step S202.

In step S207, at the time of the processing, the system control unit 110 separately records in the system memory 120 the information indicating the focus adjustment position held in the system memory 120, i.e., information corresponding to the position of the focus frame 303, as a temporary value of the focus adjustment position. The set position at this time coincides with the display position of the focus frame 303. Next, in step S208, the system control unit 110 performs control via the image output unit 105 so that the image is displayed in an enlarged manner. At this time, the system control unit 110 displays an enlarged image of a partial area that is included in the captured image, has its center at the focus adjustment position, i.e., a position coinciding with the central coordinates of the focus frame 303, and is determined by the enlargement ratio. Hereinafter, an area to be displayed in an enlarged manner will be referred to as an "enlarged area".

If the focus frame 303 is displayed in an outer portion of the entire image 300, and when the central coordinates of the focus frame 303 and the entire image 300 are caused to coincide with each other, there is a possibility that the enlarged area is located outside an image area. In response, the system control unit 110 determines as the enlarged area an area in which the enlarged area is not located outside the image area, and the central coordinates of the focus frame 303 and the central coordinates of the entire image 300 are as close to each other as possible. Further, there is a case where the display position of the focus frame 303 or the position of the enlarged area is limited to a certain movement space. Also in this case, the system control unit 110 determines as the enlarged area an area in which the central coordinates of the enlarged area and the central coordinates of the focus frame 303 are as close to each other as possible. Consequently, after the enlargement, the user can smoothly check the state of the focus adjusted on the basis of the object 301 on which the focus frame 303 is displayed in a superimposed manner. In addition to the enlargement, the system control unit 110 may also apply a peaking process for emphasizing the sharpness. Based on this, it is possible to indicate the focus state of the enlarged image in a more easily understandable manner.

Figure 3B:
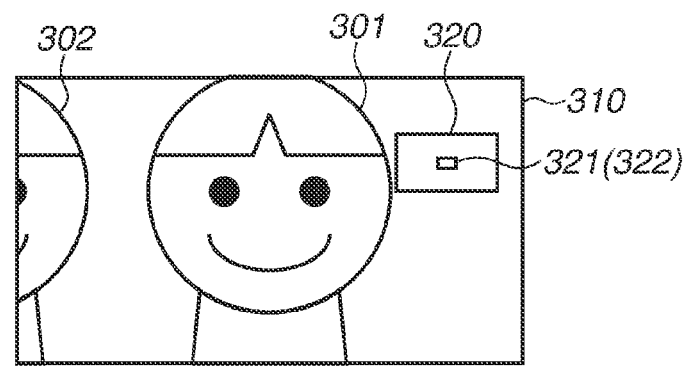

Next, in step S209, the system control unit 110 displays a radar in a superimposed manner on the enlarged image displayed in step S208. Here, the radar is an image indicating the position of the enlarged area and the focus adjustment position relative to the entire image. FIG. 3B is a diagram illustrating an example of the display of the display unit 106 in step S209. On the display unit 106, an enlarged image 310 of the partial area (the enlarged area) of the entire image 300 is displayed. The entire image 300 is displayed in an enlarged manner. Thus, in the enlarged image 310, the objects 301 and 302 are displayed such that the objects 301 and 302 are larger than the objects 301 and 302 illustrated in FIG. 3A. Further, a radar 320 is displayed in a superimposed manner on the enlarged image 310.

The radar 320 is an image indicating as a rectangle the entire image captured by the image capture unit 102. Further, the radar 320 includes an enlarged area indicator 321 and a focus adjustment position indicator 322. The enlarged area indicator 321 is an image drawn at the position of the enlarged area in the rectangle of the radar 320. That is, the enlarged area indicator 321 is an image indicating the position of the enlarged area. Further, the focus adjustment position indicator 322 is an image drawn at the focus adjustment position in the rectangle of the radar 320. The focus adjustment position indicator 322 is displayed on the basis of the temporary value of the focus adjustment position recorded in step S207 and indicates the focus adjustment position in an entire display state before being switched to an enlarged display state. Here, the enlarged display state is the state where the enlarged area is displayed on the display unit 106. The entire display state is the state where the entire image is displayed. That is, the radar 320 is an image indicating the focus adjustment position in the entire image and is an example of a display item indicating a focus adjustment position. At the time of the processing in step S209, the position of the enlarged area and the focus adjustment position are the same position. Thus, the enlarged area indicator 321 and the focus adjustment position indicator 322 are displayed in the state where the enlarged area indicator 321 and the focus adjustment position indicator 322 overlap each other. The display of the radar 320 enables the user to visually check the position of the enlarged area displayed in an enlarged manner and the focus adjustment position on the display unit 106 at the time of the processing.

Next, in step S210, the system control unit 110 determines whether the focus ring 111 or the one-shot AF key 117 is operated. The process of step S210 is similar to the process of step S205. If it is determined that the focus ring 111 or the one-shot AF key 117 is operated (YES in step S210), the processing proceeds to step S211. If it is determined that neither the focus ring 111 nor the one-shot AF key 117 is operated (NO in step S210), the processing proceeds to step S212. In step S211, the system control unit 110 drives the focus lens in the lens barrel 101 to adjust the focus. After the process of step S211, the processing proceeds to step S210. The process of adjusting the focus in step S211 is similar to the process of step S206. The focus adjustment position held in the system memory 120 will be updated according to the enlarged area in the process of step S213. Thus, in a case where AF is performed in step S211, AF is performed within the enlarged area.

In step S212, the system control unit 110 determines whether any of the directions on the directional pad 114 is pressed. If it is determined that the directional pad 114 is pressed (YES in step S212), the processing proceeds to step S213. If it is determined that the directional pad 114 is not pressed (NO in step S212), the processing proceeds to step S216. In step S213, according to the operation on the directional pad 114, the system control unit 110 receives a movement instruction to move the enlarged area as a display target of the display unit 106, moves the enlarged area according to the movement instruction, and performs control so that the moved enlarged area is displayed. This process is an example of a reception process for receiving a movement instruction, and a display control process for performing control so that the moved enlarged area according to the movement instruction is displayed. The system control unit 110 further determines a new focus adjustment position on the basis of the position of the moved enlarged area and updates the focus adjustment position held in the system memory 120 to the new focus adjustment position. More specifically, the system control unit 110 determines as a new focus adjustment position a position as close to the central coordinates of the moved enlarged area as possible. The focus adjustment position indicator 322 is displayed on the basis of the temporary value of the focus adjustment position recorded in step S207. Thus, even if the focus adjustment position is updated in step S211, the display position of the focus adjustment position indicator 322 does not change.

The focus adjustment position may only need to be determined based on the position of the enlarged area displayed at the time of the processing, and a specific method for determining the focus adjustment position is not limited to the exemplary embodiment. Alternatively, as another example, the system control unit 110 may divide the enlarged area into a plurality of partial areas, calculate focus evaluation values of the respective partial areas, and on the basis of the position of the partial area having the highest evaluation value, determine the focus adjustment position. For example, the focus evaluation value is calculated based on the contrast or the amount of defocus of the image. Consequently, it is possible to perform the operation of readjusting the focus more smoothly after the enlargement ends.

Yet alternatively, as another example, the system control unit 110 may detect a main object determined in advance such as the face of a person from an image of the enlarged area, and based on the position of the detection, determine the focus adjustment position. Consequently, it is possible to smoothly focus on the main object by continuously tracking the main object. Yet alternatively, as another example, the system control unit 110 may obtain distance measurement positions at a plurality of positions in the enlarged area using zone AF or artificial intelligence autofocus (AIAF), and determine as the focus adjustment position a position corresponding to an object present at the closest position to the digital video camera. Yet alternatively, as another example, according to a user operation, the system control unit 110 may determine any position in the enlarged area as the focus adjustment position.

Next, in step S214, according to the position of the moved enlarged area, the system control unit 110 moves the display position of the enlarged area indicator 321. Next, in step S215, the system control unit 110 performs control so that a key guide for operation methods is displayed. Then, the processing proceeds to step S210.

Figure 3C:
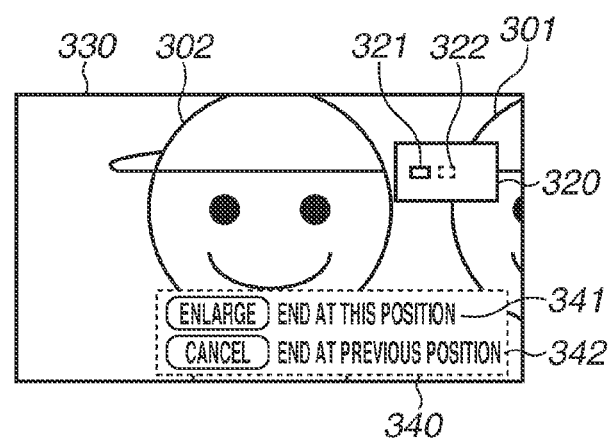

FIG. 3C is a diagram illustrating an example of the display of the display unit 106 in step S215. The enlarged area moves according to the movement instruction, and as illustrated in FIG. 3C, on the display unit 106, an enlarged image 330 of an area different from the area displayed in FIG. 3B is displayed. The enlarged image 330 is an image of an area to the left of the enlarged image 310. Further, on the enlarged image 330, a key guide 340 is displayed. The key guide 340 includes guides 341 and 342.

The guide 341 is information explaining to the user that if the enlarged display is ended by pressing the enlarge key 118, the display position of the focus frame 303 will be changed on the basis of the enlarged area displayed when the enlarged display is performed. The guide 342 is information explaining to the user that if the enlargement is ended by pressing the cancel key 116, the display position of the focus frame 303 will not be changed. The display of the key guide 340 enables the user to identify two operations for ending the enlarged display. Further, the user can determine which of the two operations is appropriate.

In step S216, the system control unit 110 determines whether the set key 115 is pressed. If it is determined that the set key 115 is pressed (YES in step S216), the processing proceeds to step S217. If it is determined that the set key 115 is not pressed (NO in step S216), the processing proceeds to step S219. In step S217, the system control unit 110 changes the enlargement magnification of the image. For example, every time the set key 115 is pressed in step S216, the system control unit 110 changes the enlargement magnification to twice, four times, eight times, twice, . . . in a toggled manner. Next, in step S218, the system control unit 110 changes the size of the enlarged area indicator 321 of the radar 320 according to the enlargement magnification determined in step S217. Then, the processing proceeds to step S210.

In step S219, the system control unit 110 determines whether the enlarge key 118 is pressed. If it is determined that the enlarge key 118 is pressed (YES in step S219), the processing proceeds to step S220. If it is determined that the enlarge key 118 is not pressed (NO in step S219), the processing proceeds to step S224. In step S220, the system control unit 110 performs control so that the radar 320 including the enlarged area indicator 321 and the focus adjustment position indicator 322 is erased from the display unit 106. Next, in step S221, the system control unit 110 performs control so that the key guide 340 is erased from the display unit 106.

Next, in step S222, the system control unit 110 performs control so that the enlarged display of the image is ended. In step S223, the system control unit 110 switches the display state from the enlarged display state to the entire display state. This process is an example of a switching process. Further, the system control unit 110 performs control so that the focus frame 303 is displayed in a superimposed manner on the entire image at a display position corresponding to the focus adjustment position held in the system memory 120. As described in step S213, the focus adjustment position held in the system memory 120 is updated according to the movement of the enlarged area and is a position based on the enlarged area. As described above, in step S223, the system control unit 110 performs control so that the focus frame 303 as a display item is displayed in a superimposed manner at a position determined according to the position of the enlarged area displayed on the display unit 106 at the time of the end of the enlarged display.

Figure 3D:
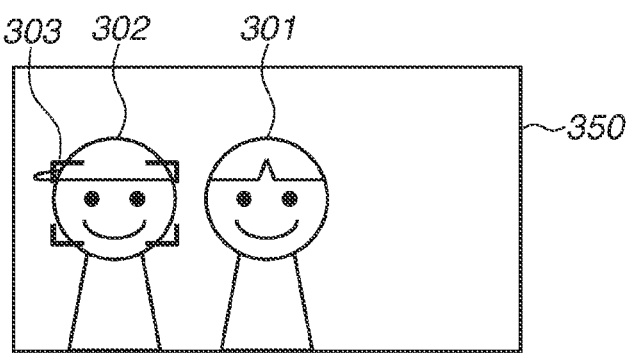

FIG. 3D is a diagram illustrating an example of the display of the display unit 106 in step S223. On the display unit 106, an entire image 350 is displayed again. Further, in the example of FIG. 3D, the focus adjustment position is changed from the position of the object 301 to the position of the object 302, and the focus frame 303 is displayed in a superimposed manner at the position of the object 302. If the enlarge key 118 is pressed at the time when the area of the object 302 is displayed in an enlarged manner as illustrated in FIG. 3C, the display position of the focus frame 303 is thus changed.

In step S224, the system control unit 110 determines whether the cancel key 116 is pressed. If it is determined that the cancel key 116 is pressed (YES in step S224), the processing proceeds to step S225. If it is determined that the cancel key 116 is not pressed (NO in step S224), the processing proceeds to step S210. The processes of steps S225, S226, and S227 are similar to the processes of steps S220, S221, and S222.

In step S228, the system control unit 110 updates the focus adjustment position held in the system memory 120, using the temporary value recorded in step S207, i.e., the focus adjustment position (the set position) set for the image before the enlarged display. That is, the system control unit 110 changes back the focus adjustment position to the position before the enlarged display. Then, after the enlarged display, the system control unit 110 performs control so that the entire image is displayed, and further performs control so that the focus frame 303 is displayed in a superimposed manner on the entire image at a position indicating the focus adjustment position. As described above, if the cancel key 116 is pressed, the system control unit 110 performs control so that when the entire image is displayed after the enlarged display, the focus frame 303 is displayed at the focus adjustment position (the set position) set before the enlarged display. As described above, the user presses the enlarge key 118 or the cancel key 116, which is an operation member, and thereby can specify whether the display position of the focus frame 303 is to be changed. That is, operation methods for specifying whether the display position of the focus frame 303 is to be changed are operation methods using different operation members as operation targets.

As described above, in a case where the enlarged area is moved during enlarged display, the digital video camera according to the first exemplary embodiment can switch, according to a user operation, whether to change the focus adjustment position according to the movement of the enlarged area. Thus, for example, in a case where an enlargement position is changed according to the movement of a main object during enlarged display, the system control unit 110 can change the focus adjustment position according to the position of the enlarged area after the change. On the other hand, in a case where the enlarged area is changed, and another object is checked, the system control unit 110 can also maintain the previous focus adjustment position before the enlarged display without changing the focus adjustment position according to the moved enlarged area. As described above, according to a user operation, the digital video camera can perform display and make a setting at an appropriate focus adjustment position according to the situation.

As a first variation of the first exemplary embodiment, the system control unit 110 may receive an instruction to end the enlarged display and an instruction to adjust the focus adjustment position after the cancellation of the enlargement to the enlarged area (the operation of finalizing the focus adjustment position) at different timings.

Figure 4:
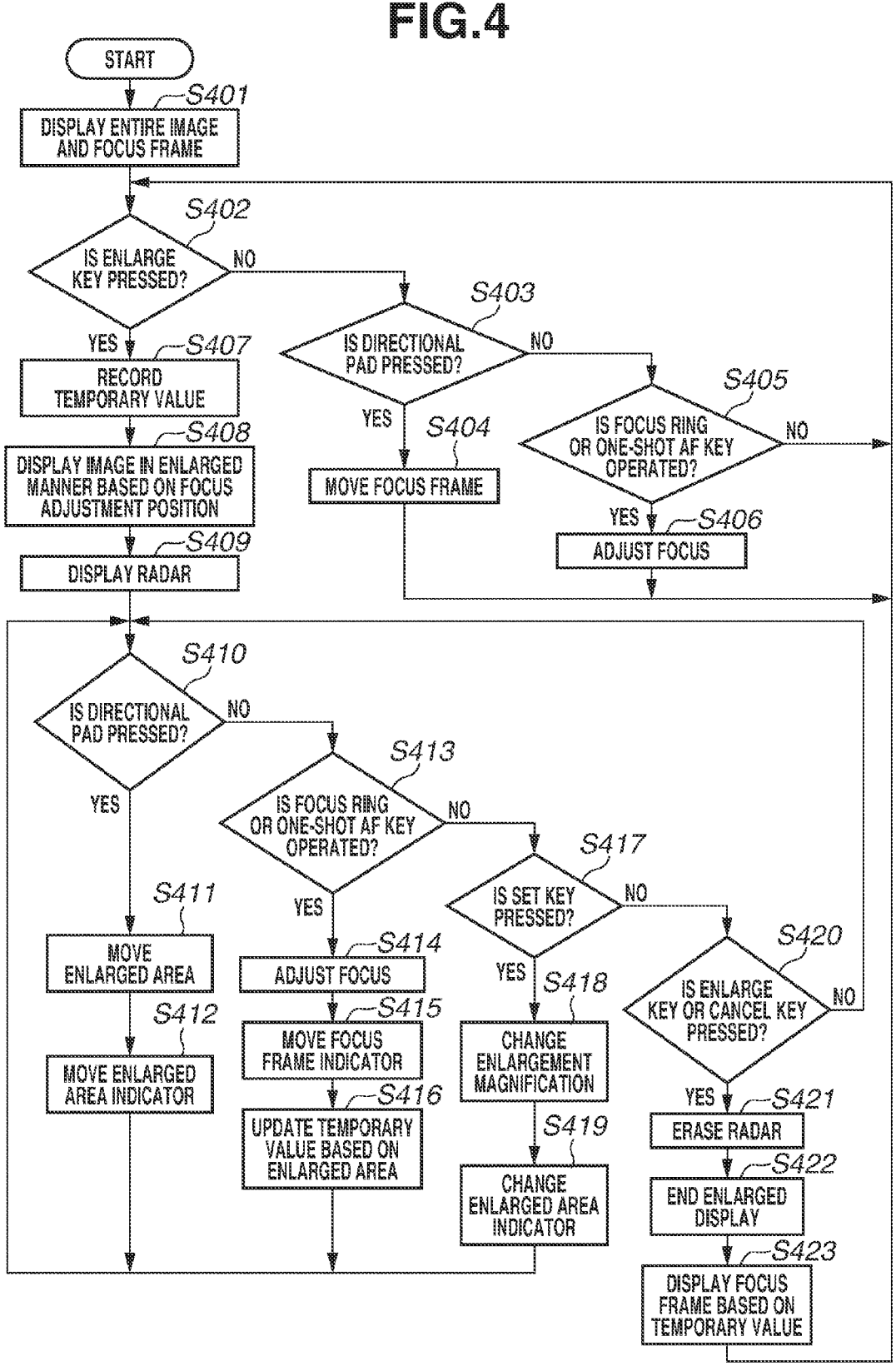
FIG. 4 is a flowchart illustrating a display control process.
Figure 5A:
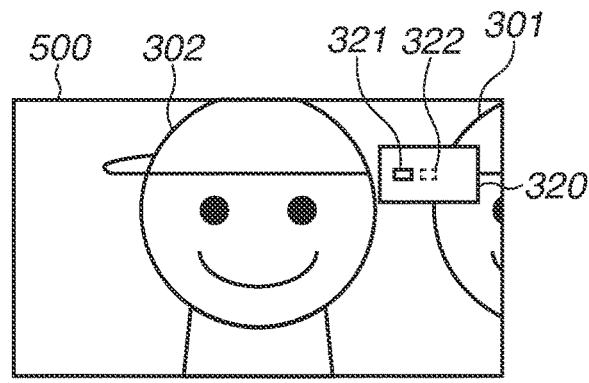
FIGS. 5A to 5C are diagrams illustrating examples of display of a display unit.
Figure 5B:
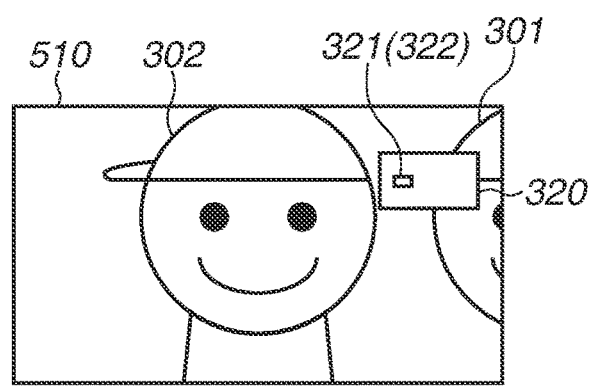
Figure 5C:
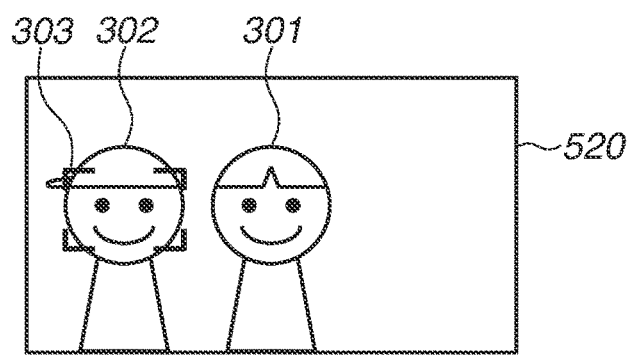

Next, a digital video camera according to a second exemplary embodiment is described. The configuration of the digital video camera according to the second exemplary embodiment is similar to the configuration of the digital video camera according to the first exemplary embodiment. FIG. 4 is a flowchart illustrating a display control process performed by the digital video camera according to the second exemplary embodiment. The operation of this flowchart is achieved by the system control unit 110 controlling the components of the digital video camera on the basis of a program stored in the non-volatile memory 124. This flowchart is executed in the state where the focus mode switch 112 is set to MF. Further, FIGS. 5A to 5C are diagrams illustrating examples of a display screen displayed on the display unit 106 in the process of the operation illustrated in the flowchart in FIG. 4. The processes of steps S401 to S409 are similar to the processes of steps S201 to S209 described with reference to FIG. 2. In step S401, the entire image 300 in FIG. 3A is displayed. In step S409, the enlarged image 310 in FIG. 3B is displayed.

After the process of step S409, the processing proceeds to step S410. In step S410, the system control unit 110 determines whether any of the directions on the directional pad 114 is pressed. If it is determined that the directional pad 114 is pressed (YES in step S410), the processing proceeds to step S411. If it is determined that the directional pad 114 is not pressed (NO in step S410), the processing proceeds to step S413. In step S411, according to the operation on the directional pad 114, the system control unit 110 moves the enlarged area as a display target and performs control so that the moved enlarged area is displayed. Next, in step S412, according to the position of the moved enlarged area, the system control unit 110 moves the display position of the enlarged area indicator 321. Then, the processing proceeds to step S410. The processes of steps S411 and S412 are similar to the processes of steps S213 and S214 described with reference to FIG. 2.

FIG. 5A is a diagram illustrating an example of the display of the display unit 106 in step S412. The enlarged area moves from its position of the enlarged image 310 in FIG. 3B, and on the display unit 106, an enlarged image 500 of an area to the left of the enlarged image 310 is displayed as illustrated in FIG. 5A. Further, on the enlarged image 500, the radar 320 is displayed in a superimposed manner. Since the enlarged area moves in step S412, the enlarged area indicator 321 and the focus adjustment position indicator 322 are displayed at different positions in the radar 320.

Further, in step S413, the system control unit 110 determines whether the focus ring 111 or the one-shot AF key 117 is operated. This process is similar to the process of step S405. If it is determined that the focus ring 111 or the one-shot AF key 117 is operated (YES in step S413), the processing proceeds to step S414. If it is determined that neither the focus ring 111 nor the one-shot AF key 117 is operated (NO in step S413), the processing proceeds to step S417.

The process of adjusting the focus in step S414 is similar to the process of step S206. The focus adjustment position held in the system memory 120 is updated according to the enlarged area in the process of step S411. Thus, in a case where AF is performed in step S414, AF is performed within the enlarged area. Next, in step S415, the system control unit 110 moves the display position of the focus frame indicator to the position of the enlarged area that is being displayed at the time of the processing in step S415, i.e., at the time when a focus adjustment operation is received. That is, the system control unit 110 moves the display position of the focus frame indicator to the same position as the display position of the enlarged area indicator 321. FIG. 5B is a diagram illustrating an example of the display of the display unit 106 in step S415. The radar 320 is displayed in a superimposed manner on an enlarged image 510. In FIG. 5B, by the process of step S415, the focus adjustment position indicator 322 is displayed at the same position as that of the enlarged area indicator 321. As described above, the movement of the focus adjustment position indicator 322 enables the user to recognize that the focus frame 303 moves.

Next, in step S416, the system control unit 110 updates the temporary value of the focus adjustment position recorded in the system memory 120, using the focus adjustment position held in the system memory 120. If the enlarged area is changed, the focus adjustment position held in the system memory 120 is updated according to the enlarged area in the process of step S411. That is, the focus adjustment position held in the system memory 120 is a position determined according to the position of the enlarged area that is being displayed at the time when the focus adjustment operation is received. As described above, the focus adjustment operation is also a change instruction to change the focus adjustment position after the cancellation of the enlarged display. After the process of step S416, the processing proceeds to step S410.

Further, in step S417, the system control unit 110 determines whether the set key 115 is pressed. If it is determined that the set key 115 is pressed (YES in step S417), the processing proceeds to step S418. If it is determined that the set key 115 is not pressed (NO in step S417), the processing proceeds to step S420. The processes of steps S418 and S419 are similar to the processes of steps S217 and S218 described with reference to FIG. 2.

Further, in step S420, the system control unit 110 determines whether the enlarge key 118 or the cancel key 116 is pressed. If it is determined that the enlarge key 118 or the cancel key 116 is pressed (YES in step S420), the processing proceeds to step S421. If it is determined that neither the enlarge key 118 nor the cancel key 116 is pressed (NO in step S420), the processing proceeds to step S410. In step S421, the system control unit 110 performs control so that the display of the radar 320 including the enlarged area indicator 321 and the focus adjustment position indicator 322 is erased from the display unit 106. In step S422, the system control unit 110 performs control so that the enlarged display of the image is ended.

Next, in step S423, the system control unit 110 performs control so that the entire image is displayed on the display unit 106. Further, the system control unit 110 updates the focus adjustment position held in the system memory 120 using the position, on the entire image, of the temporary value of the focus adjustment position recorded in the system memory 120. Then, the system control unit 110 performs control so that the focus frame 303 is displayed in a superimposed manner at the focus adjustment position. FIG. 5C is a diagram illustrating an example of the display of the display unit 106 in step S423 in a case where the temporary value is updated in step S416. On the display unit 106, an entire image 520 is displayed again. Further, in the example of FIG. 5C, the focus frame 303 is displayed in a superimposed manner at the position of the updated temporary value of the focus adjustment position. If the temporary value is not updated in step S416, the focus frame 303 is displayed in a superimposed manner according to the temporary value recorded in step S407, i.e., at the focus adjustment position set before the enlarged display. Other components and processes of the digital video camera according to the second exemplary embodiment are similar to the components and the processes of the digital camera according to the first exemplary embodiment.

As described above, according to whether a change instruction to change the focus adjustment position (a focus adjustment operation) is received during enlarged display, the digital camera according to the second exemplary embodiment can automatically determine whether the display position and the set position of the focus frame is to be changed. That is, similarly to the digital camera according to the first exemplary embodiment, in response to a user operation, the digital camera according to the present exemplary embodiment can also perform display and make a setting at an appropriate focus adjustment position according to the situation.

The description has been given on the assumption that the system control unit 110 controls the above various types of control. Alternatively, a single piece of hardware may control the above various types of control. Yet alternatively, a plurality of pieces of hardware may share processing to control the entirety of the apparatus.

While the disclosure has been described in detail based on its suitable exemplary embodiments, the disclosure is not limited to these specific exemplary embodiments. The disclosure also includes various forms without departing from the spirit and scope of the disclosure. Further, the above exemplary embodiments merely illustrate exemplary embodiments of the disclosure, and can also be appropriately combined with each other.

Further, the above exemplary embodiments have been described taking as an example a case where the disclosure is applied to a digital video camera. The disclosure, however, is not limited to this example, and is applicable to any apparatus capable of displaying a captured image in an enlarged manner. For example, the disclosure may be applied to an information processing apparatus, such as a mobile terminal having a remote live view function capable of receiving an image captured by a camera and displaying or processing the image. Alternatively, as another example, the disclosure may be applied to an information processing apparatus capable of displaying a still image or a moving image that can be refocused after being captured. That is, the disclosure is applicable to, for example, a personal computer, a personal digital assistant (PDA), a mobile phone terminal, a mobile image viewer, a printer apparatus including a display, a digital photo frame, a music player, a game apparatus, and an electronic book reader. Further, the disclosure is applicable to, for example, a tablet terminal, a smartphone, a projection apparatus, a household electrical appliance apparatus including a display, and an in-car apparatus.

According to the above exemplary embodiments, after an image is enlarged, and an enlarged area is changed, an image indicating an appropriate focus adjustment position according to the situation can be displayed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-220415, filed Nov. 11, 2016, which is hereby incorporated by reference herein in its entirety.

What is claimed is:

1. A display control apparatus comprising:
a memory and at least one processor which function as:
a reception unit configured to, in an enlarged display state where a partial enlarged area in a captured image is displayed on a display unit, receive a movement instruction to perform a movement of the enlarged area as a display target of the display unit;
a switching unit configured to switch the enlarged display state to an entire display state where an entirety of the captured image is displayed;
a display control unit configured to perform control so that when the enlarged display state is switched to the entire display state, and in a case where a particular operation is performed in the enlarged display state, a display item regarding focus adjustment is displayed at a position which is determined according to the enlarged area after the movement of the enlarged area, and in a case where the particular operation is not performed in the enlarged display state, the display item regarding focus adjustment is displayed at a position unrelated to the movement of the enlarged area; and a holding unit configured to, when the entire display state is switched to the enlarged display state, hold information corresponding to a position of the display item displayed in the entire display state before the switching, wherein the display control unit performs control so that when the enlarged display state is switched to the entire display state, and in a case where the display item is displayed at the position unrelated to the movement of the enlarged area according to the movement instruction, the display item is displayed at a position based on the information held in the holding unit.

2. The display control apparatus according to claim 1, wherein the particular operation is an operation of cancelling enlarged display using a first operation method, and wherein the display control unit performs control so that in a case where an operation of cancelling enlarged display using a second operation method is performed, and when the enlarged display is canceled, the display item is displayed at the position unrelated to the movement of the enlarged area according to the movement instruction.

3. The display control apparatus according to claim 2, wherein the first operation method and the second operation method are operation methods using different operation members as operation targets.

4. The display control apparatus according to claim 2, wherein the display control unit performs control so that a first guide indicating that a display position of the display item changes between a case where an operation is performed using the first operation method and a case where an operation is performed using the second operation method is displayed.

5. The display control apparatus according to claim 1, wherein the particular operation is an operation of adjusting a focus.

6. The display control apparatus according to claim 1, wherein the display control unit performs control so that in the enlarged display state, a second guide indicating a position indicated by the information held in the holding unit and a position of the enlarged area relative to the captured image is displayed.

7. The display control apparatus according to claim 1, wherein the display control unit performs control so that in the entire display state, the display item is displayed in a superimposed manner on the captured image.

8. The display control apparatus according to claim 1, wherein the display control unit performs control so that when the enlarged display state is switched to the entire display state, and in a case where the display item is displayed at the position determined according to the enlarged area after the enlarged area is moved according to the movement instruction, the display item is displayed at a position having the highest focus evaluation value in the moved enlarged area.

9. The display control apparatus according to claim 1, wherein the display control unit performs control so that when the enlarged display state is switched to the entire display state, and in a case where the display item is displayed at the position which is determined according to the enlarged area after movement of the enlarged area based on the movement instruction, the display item is displayed at a position of a particular object detected from the moved enlarged area.

10. The display control apparatus according to claim 1, wherein the position where the display item is displayed is a focus adjustment position where AF is performed, or a position where an amount of defocus is acquired.

11. A display control method executed by a display control apparatus, the display control method comprising:

in an enlarged display state where a partial enlarged area in a captured image is displayed on a display unit, receiving a movement instruction to perform a movement of the enlarged area as a display target of the display unit;

switching the enlarged display state to an entire display state where an entirety of the captured image is displayed; and performing control so that when the enlarged display state is switched to the entire display state, and in a case where a particular operation is performed in the enlarged display state, a display item regarding focus adjustment is displayed at a position which is determined according to the enlarged area after the movement of the enlarged area, and in a case where the particular operation is not performed in the enlarged display state, the display item regarding focus adjustment is displayed at a position unrelated to the movement of the enlarged area; and when the entire display state is switched to the enlarged display state, holding information corresponding to a position of the display item displayed in the entire display state before the switching, wherein the performing control performs control so that when the enlarged display state is switched to the entire display state, and in a case where the display item is displayed at the position unrelated to the movement of the enlarged area according to the movement instruction, the display item is displayed at a position based on the held information.

12. A non-transitory computer-readable storage medium having stored therein a program for causing a computer to function as the units of the display control apparatus according to claim 1.

* * * * *